(12) United States Patent
O'Gorman

(10) Patent No.: US 7,636,071 B2
(45) Date of Patent: Dec. 22, 2009

(54) PROVIDING INFORMATION IN A MULTI-SCREEN DEVICE

(75) Inventor: Robert W. O'Gorman, Tigard, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 611 days.

(21) Appl. No.: 11/290,612

(22) Filed: Nov. 30, 2005

(65) Prior Publication Data

US 2007/0120762 A1 May 31, 2007

(51) Int. Cl.
*G09G 5/00* (2006.01)
(52) U.S. Cl. .......................................... 345/1.1; 345/1.2
(58) Field of Classification Search .................... 345/60, 345/77–87, 73, 1.1–3.1, 901–905, 9, 173–175; 348/588, 840
See application file for complete search history.

(56) References Cited

U.S. PATENT DOCUMENTS

| | | | |
|---|---|---|---|
| 5,663,748 A | 9/1997 | Huffman | |
| 5,734,513 A | 3/1998 | Wang et al. | |
| 5,761,485 A | 6/1998 | Munyan | |
| 5,796,577 A * | 8/1998 | Ouchi et al. | 361/681 |
| 5,956,034 A | 9/1999 | Sachs et al. | |
| 6,034,701 A | 3/2000 | Drebus | |
| D430,117 S | 8/2000 | Sachs et al. | |
| 6,229,502 B1 | 5/2001 | Schwab | |
| 6,493,734 B1 | 12/2002 | Sachs et al. | |
| 6,512,497 B1 | 1/2003 | Kondo et al. | |
| 6,642,909 B1 | 11/2003 | Olivia | |
| 6,778,383 B2 * | 8/2004 | Ho | 361/681 |
| 7,092,247 B2 * | 8/2006 | Kim | 361/681 |
| 2001/0024195 A1 | 9/2001 | Hayakawa | |

FOREIGN PATENT DOCUMENTS

| | | |
|---|---|---|
| DE | 42 18 179 A1 | 12/1993 |
| EP | 1 311 126 A | 5/2003 |
| WO | WO 01/42979 | 6/2001 |
| WO | WO 03/081404 | 10/2003 |

OTHER PUBLICATIONS

PCT International Preliminary Report on Patentability, PCT/US2006/036495, Jun. 12, 2008, pp. 1-9.

(Continued)

*Primary Examiner*—Richard Hjerpe
*Assistant Examiner*—Mansour M Said

(57) ABSTRACT

A method of displaying information in an information display device may include retrieving an information file from storage media accessible from an information display device, displaying a first portion of the retrieved file in a first electronic display screen based on a first value from a sensor, displaying a second portion of the retrieved file in a second electronic display screen based on a second value from the sensor, and subsequently displaying either the first portion or a third portion of the retrieved file in the first electronic display screen based on a third value from the sensor. The information display device may include a first panel and a second panel connected to the first panel, two or more electronic display screens disposed on the first and second panels, and a sensor that provides a value representative of an angle of the first panel relative to the second panel.

19 Claims, 9 Drawing Sheets

OTHER PUBLICATIONS

PCT International Search Report, PCT/US2006/036495, Apr. 20, 2007, pp. 1-4.

PCT Written Opinion of the International Searching Authority, PCT/US2006/036495, Apr. 20, 2007, pp. 1-7.

Gemstar eBook Model GEB 1150 Information, 8 pages, last accessed Sep. 26-27, 2005, available at http://www.gemstar-ebook.com/ebcontent/devices.

Gemstar eBook Model GEB 2150 Information, 7 pages, last accessed Sep. 26-27, 2005, available at http://www.gemstar-ebook.com/ebcontent/devices.

Munyan, Daniel "Everybook, Inc.: Developing the E-Book in Relation to Publishing Standards," 7 pages, *Future of Print Media Journal*, Business—Sep. 30, 1998, available at http://www.futureprint.kent.edu/articles/munyan01.htm.

"Emerging Technologies Conference at MIT," TechnologyReview, May 2005, 5 pages, available at, http://www.technologyreview.com/articles/05/05/issue/feature_library.0.asp (last printed Sep. 15, 2005).

\* cited by examiner

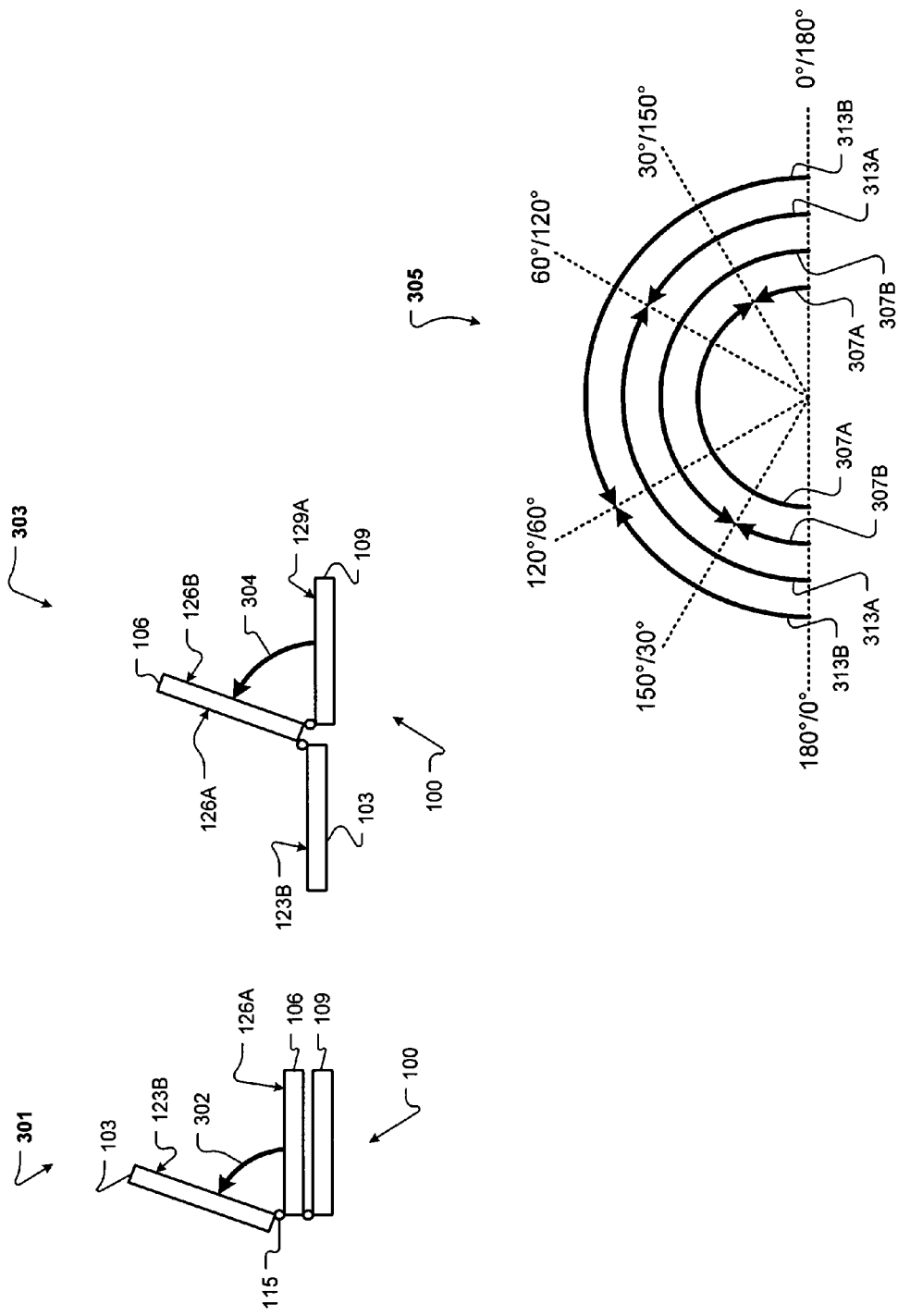

PROVIDING INFORMATION IN A MULTI-SCREEN DEVICE

TECHNICAL FIELD

This disclosure relates to providing information in a multi-screen device.

BACKGROUND

Information is increasingly being processed and stored in an electronic format. People frequently access this electronic information from a variety of mobile devices. A businessperson may use a wireless-enabled personal digital assistant (wireless PDA) to communicate with others via email or to manage his or her calendar. A student may use a tablet computer to take digital, handwritten notes during lectures. A commuter may use a smart phone to access news or weather information, or other Web content, from the Internet.

SUMMARY

Although a person may use a variety of mobile electronic devices to manage a myriad of electronic information, he or she may hesitate to use an electronic reading device to read books or periodicals. This document describes devices, systems and methods that may be used to access books or other printed information in an electronic format. For example, an information display device may be used as an electronic replacement for textbooks, field service manuals or novels. In particular, this document describes a multi-screen information display device having two or more panels. The panels may be hinged along a common edge, allowing them to be rotated. A plurality of screens may be disposed on either side of each panel. For example, in some implementations, the multi-screen information display device may have three panels, including a front panel, an interior panel, and a back panel. When the panels are "closed," no screens may be visible. When the front panel is "opened," two screens may be visible—one on the back side of the front panel, and one on the front side of the interior panel. When the interior panel is also "opened," another two screens may be visible—one on the back side of the interior panel, and one on the front side of the back panel.

The information display device may further include a sensor that senses manipulation of the panels by a user, and a controller that controls the information displayed on the various screens. The controller may receive input from the sensor and may display information accordingly. For example, information may be displayed on a first electronic display group, while a second electronic display group is powered down. The first electronic display group may include, for example, one or more screens that are visible to a user; the second electronic display group may include, for example, one or more screens that are not visible to the user. When the controller receives input that a panel is being rotated, the controller may display new information in the second electronic display group and power down the first electronic display group. The controller may also "prefetch" new information to display in the first electronic display group, such that if the user manipulates the panel again, the new information may be immediately displayed.

In one general aspect, an information display device includes a plurality of panels including at least a first panel and a second panel; a plurality of electronic display screens disposed on the plurality of panels, including at least a first screen, a second screen and a third screen; an information storage device; a sensor operable to detect when panels are moved relative to each other; and a controller. The controller is operable to display in one or more of the electronic display screens information that is stored in the information storage device in response to the sensor detecting movement of panels relative to each other. Each of the panels has a front side and back side and is hingedly connected to other panels.

In some implementations, the first screen may be disposed on the front side of the first panel, the second screen may be disposed on the back side of the first panel, and the third screen may be disposed on the front side of the second panel. In some implementations, the information display device may include a third panel and a fourth screen; the first screen may be disposed on the back side of the first panel, the second screen may be disposed on the front side of the second panel, the third screen may be disposed on the back of the second panel, and the fourth screen may be disposed on the front of the third panel. The first panel may rotate about an axis that is parallel to the length of the hinged connection between the first panel and the second panel.

In another general aspect, an information file is obtained, a first signal is received from one or more sensors, and a first portion of the obtained information file is displayed in a first electronic display group in response to the received first signal. The information file is displayed in an information display device that includes two or more panels and two or more electronic display groups. Each electronic display group includes one or more electronic display screens that display information and that are disposed on the two or more panels. In some implementations the information display device includes one or more latching mechanisms to secure two panels together, and a sensor associated with each latching mechanism that generates signals when the latching mechanism is either engaged or released. In some implementations, the information display device also includes one or more sensors that generate signals indicating at least one of an angle between two of the two or more panels or movement of one of the two or more panels relative to another of the two or more panels.

In some implementations, the operations may further include receiving a second signal from the one or more sensors, and in response to the second signal, prefetching a second portion of the obtained information file for display in a second electronic display group. A third signal may be received from the one or more sensors, and in response to the third signal, the second portion of the obtained information file may be displayed in the second electronic display group. The first portion and the second portion may be displayed simultaneously. A fourth signal may be received from the one or more sensors, and in response to the fourth signal, the first electronic display group may be powered down. A fifth signal may be received from the one or more sensors, and in response to the fifth signal, first portion may be displayed in the first electronic display group and simultaneously second portion may be displayed in the second electronic display group. A fifth signal may be received from the one or more sensors, and in response to the fifth signal, a third portion of the obtained information file may be prefetched for display in the first electronic display group. In some implementations, a sixth signal may be received from the one or more sensors, and in response to the sixth signal, the third portion of the obtained information file may be displayed in the first electronic display group. In some implementations, a control signal may be received and a sixth signal may be received from the one or more sensors, and in response to the control signal and the sixth signal, the first portion of the obtained information file may be displayed in the first electronic display group. In some implementations, the operations may further include displaying a menu of information files, and receiving user input in response to the menu. The information file may be obtained in response to the user input.

In some implementations, at least one of the two or more electronic display groups may include a touch-sensitive screen operable to receive touch-screen input. The operations may further include receiving touch-screen input associated with the first portion, storing customization data associated with the first portion in response to the touch-screen input; and displaying customized information with the first portion that corresponds to the stored customization data. The customized information may be selected from the group consisting of highlighting, a bookmark, or an annotation. The information file may be obtained from at least one of storage media in the information display device, a storage medium coupled to a storage media reader in the information display device, and networked storage media accessible to the information display device by a direct network connection or by a wireless network connection. The operations may further include providing sensory output corresponding to the first portion. The sensory output may include image output, auditory output, light output or tactile output.

In another general aspect, displaying information in an information display device includes retrieving an information file from storage media accessible from an information display device, displaying a first portion of the retrieved information file in a first electronic display screen based on a first value from a sensor, displaying a second portion of the retrieved information file in a second electronic display screen based on a second value from the sensor, and subsequently displaying either the first portion or a third portion of the retrieved information file in the first electronic display screen based on a third value from the sensor. The information display device includes a first panel and a second panel hingedly connected to the first panel, two or more electronic display screens disposed on the first panel and the second panel, and a sensor that provides a value representative of an angle of the first panel relative to the second panel.

Advantages may include any or all of the following. The information display device may provide a user with a feeling of reading a printed book. The information display device may display a large quantity of information at one time. New information may be automatically "prefetched" so that it is available to the user without substantial delay.

The general and specific aspects may be implemented using a system, a method, or a computer program, or any combination of systems, methods, and computer programs. The details of one or more implementations are set forth in the accompanying drawings and the description below. Other features, objects, and advantages will be apparent from the description and drawings, and from the claims.

DESCRIPTION OF DRAWINGS

These and other aspects will now be described in detail with reference to the following drawings.

FIG. 3A illustrates examples of various angles that may be relevant to controlling content displayed in an information display device.

Like reference symbols in the various drawings indicate like elements.

DETAILED DESCRIPTION OF EXEMPLARY IMPLEMENTATIONS

An information display device may be a mobile digital device having multiple electronic display screens that are disposed on two or more panels and that display information in a manner that may emulate the look and feel of a printed book. In some implementations, the information display device may range in size from approximately the size of a paperback book to approximately the size of a college textbook. An information display device may include two or more panels that are hinged along a common edge and that have disposed thereon the electronic display screens. The relative position or movement of the panels may, in part, determine the timing and content of information that is displayed by the electronic display screens. For example, the information display device may include a controller, a sensor and an information storage device. A sensor, such as a sensor coupled to one or more hinges, may sense relative movement of the panels or an angle between the panels, and the controller, in conjunction with the sensor, may display content based on how the panels are positioned relative to each other. As another example, a sensor may be associated with one or more latching mechanisms that secure two panels together. More particularly, a latching mechanism may secure one panel to another, and the sensor may sense whether the latching mechanism is engaged or released (e.g., whether the panels are latched together or not latched together).

Figure 1A:
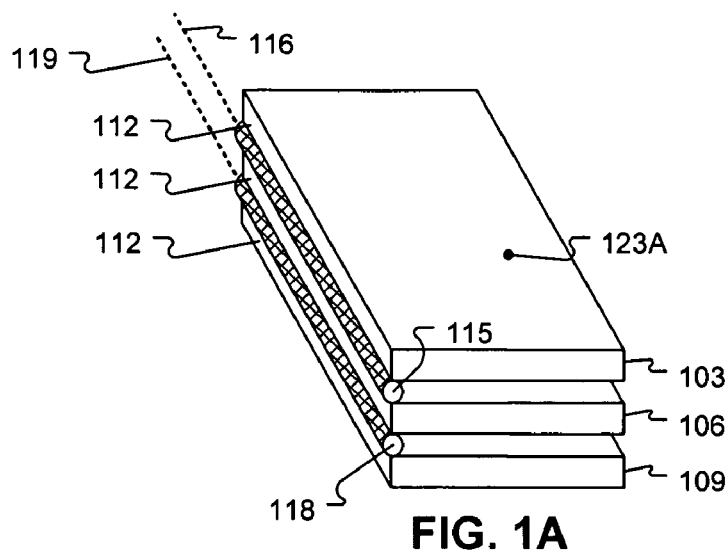
FIGS. 1A, 1B and 1C are perspective diagrams of a three-panel information display device.
Figure 1B:
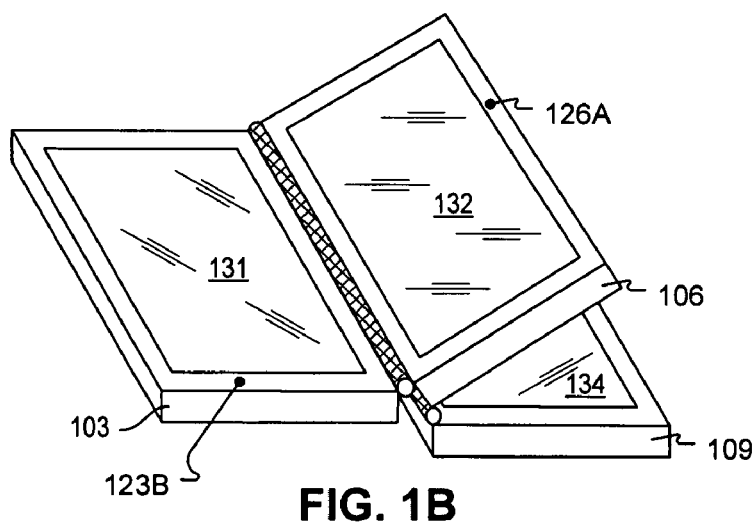
Figure 1C:
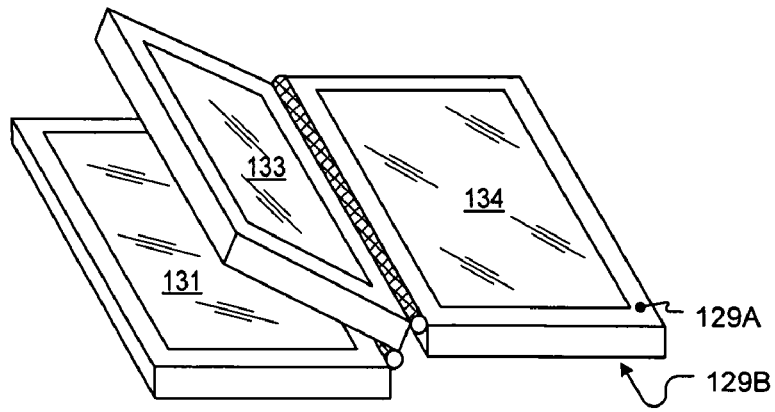

FIGS. 1A, 1B and 1C are perspective diagrams of a three-panel information display device 100. FIGS. 1A, 1B and 1C illustrate how panels in some implementations may be "opened" and "closed," and how electronic display screens may be disposed on the panels. The information display device 100 includes a first panel 103, a second panel 106 and a third panel 109. The panels are hingedly connected to each other along a common edge 112. More particularly, the first panel 103 and the second panel 106 are hingedly connected by a first hinge 115, and the second panel 106 and the third panel 109 are hingedly connected by a second hinge 118. The hinges 115 and 118 allow the panels to be rotated about axes 116 and 119 that are parallel to the length of the hinges 115 and 118, as shown in FIGS. 1B and 1C. Each panel has a front side and a back side. For example, the first panel 103 has a front side 123A and a back side 123B; a second panel 106 has a front side 126A and a back side 126B; and the third panel 109 has a front side 129A and back side 129B.

As shown, the information display device 100 includes electronic display screens disposed on the panels. For example, a first electronic display screen ("screen") 131 is disposed on the back side 123B of the first panel 103; a second screen 132 is disposed on the front side 126A of the second panel 106; a third screen 133 is disposed on the back side 126B of the second panel 106; and a fourth screen 134 is disposed on the front side 129A of the third panel 109.

Each screen may be organized within an electronic display group, and each electronic display group may include one or more electronic display screens that are controlled together. For example, as shown in FIG. 1B, screen 131 and screen 132 may comprise a first electronic display group; as shown in FIG. 1C, screen 133 and screen 134 may comprise a second electronic display group. The screens 131 and 132 in the first electronic display group may be either both powered up or both powered down, and when the controller prefetches content for display in an electronic display group, it may prefetch content for each electronic display within the electronic display group.

Figure 2A:
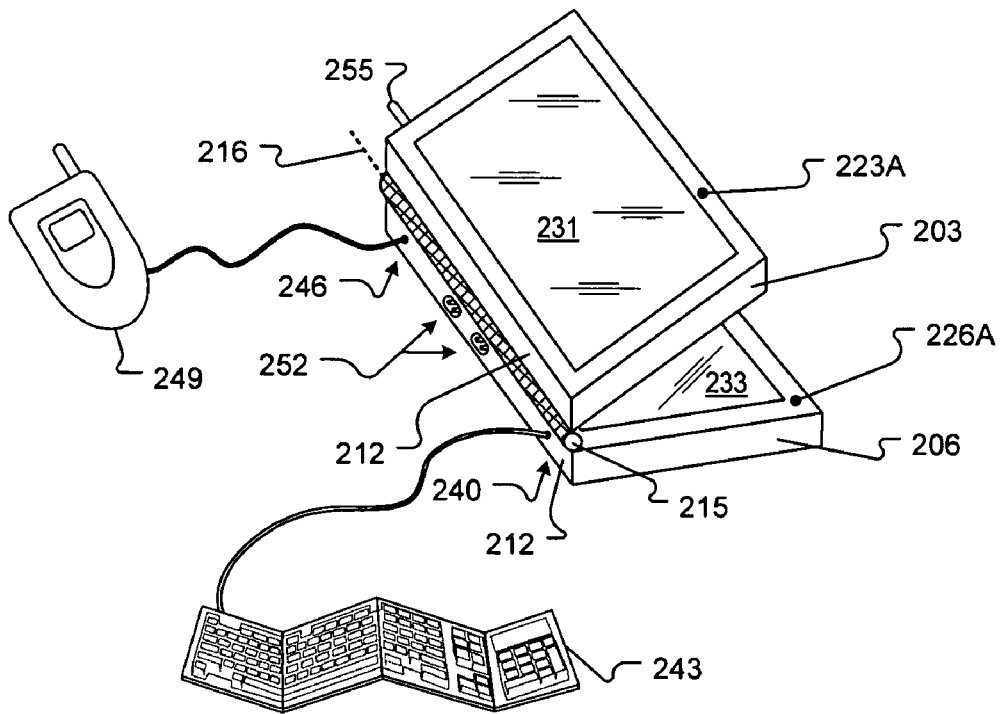
FIGS. 2A and 2B are perspective diagrams of a two-panel information display device.
Figure 2B:
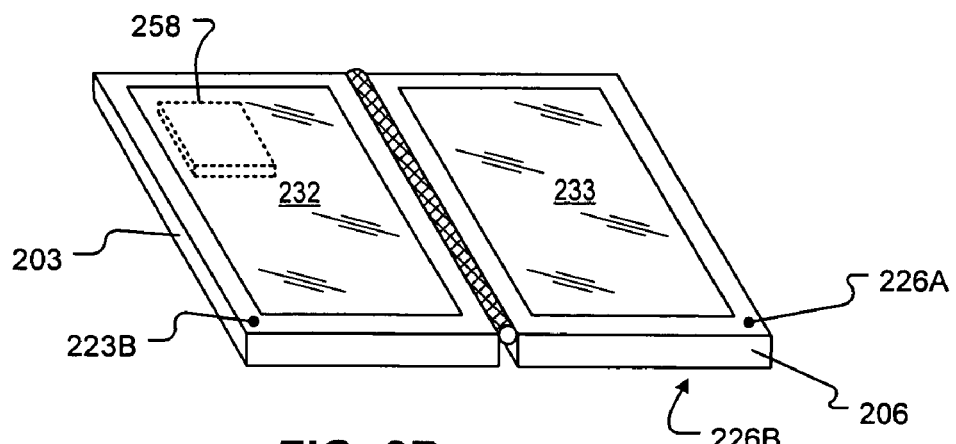

FIGS. 2A and 2B are perspective diagrams of a two-panel information display device 200. As shown, the information display device 200 includes a first panel 203 having a front side 223A and a back side 223B and a second panel 206 having a front side 226A and a back side 226B. The panels are hingedly connected along a common edge 212 by a hinge 215, and the hinge 215 allows the panels to rotate about an axis 216 that is parallel to the length of the hinge 215.

As shown, the information display device 200 has multiple electronic display screens ("screens") disposed on the panels. For example, a first screen 231 is disposed on the front side 223A of the first panel 203; a second screen 232 is disposed on the back side 223B of the first panel; and a third screen 233 is disposed on the front side 226A of the second panel 206.

The screens 231, 232 and 233 may be included in electronic display groups. For example, the screen 231 may be included in a first electronic display group, and the screens 232 and 233 may be included in a second electronic display group. As part of the second electronic display group, the screens 232 and 233 may be controlled together. For example, the screens 232 and 233 may be either both powered off or both powered on. In some implementations, only one electronic display group may be powered on or displaying or refreshing text at a time. For example, when the first electronic display group comprising the screen 231 is powered on, the second electronic display group comprising the screens 232 and 233 may be powered off; similarly, when the second electronic display group is powered on, the first electronic display group may be powered off. In this manner, power may be conserved, and information may be effectively displayed in the information display device.

In addition to screens, an information display device 200 may include input and output elements. For example, the information display device 200 may include switch inputs (not shown), which may, for example, control power to the information display device 200 or facilitate selection of content to display in the information display device 200. In some implementations, one or more screens may themselves include input functionality. For example, a screen may have a touch-sensitive surface operable to receive input from a user.

In some implementations, customization data associated with touch-screen input may be stored with a portion of an information file for subsequent display. For example, a user may enter, via a touch screen, annotations, or highlighting or bookmarks to associate with a portion of an information file. The information display device 200 may receive the touch-screen input, generate customization data in response to the touch-screen input (e.g., highlighting for particular words) and associate the customization data with a portion of a corresponding information file for subsequent display. More particularly, an information display device may display an information file corresponding to textbook material. A user may use the touch screen to highlight a first portion of the material and to make annotations corresponding to a second portion of the material. The information display device 200 may store customization data that enables it to subsequently display the highlighting with the first portion of the material and the annotations with the second portion of the material. The information display device 200 may include a stylus input device for use alone or in combination with a touch-sensitive screen. In some implementations, the information display device may display user-entered annotations or notes on a dedicated screen, which may be specified by the user. For example, referring to FIGS. 2A and 2B, the user may specify that annotations or notes be displayed on screen 231. The annotations or notes may correspond to content that is displayed on screens 232 and 233.

The information display device 200 may further include output elements (not shown) other than the screens 231, 232 and 233. For example, in some implementations, the information display device 200 may include a speaker or buzzer for playing audio output; a light (e.g., a light-emitting diode (LED)) for producing light output; or a piezoelectric device for generating mechanical or tactile output that may be perceived by a user via, for example, a tactile output pad.

In addition to integrated input and output devices, the information display device 200 may also include ports or interfaces to which additional input or output devices may be connected. For example, the information display device 200 may include a port 240 to which a keyboard 243 may be connected to facilitate text input. In some implementations, the information display device 200 may include another port 246 to which a mobile device 249 (e.g., a personal digital assistant (PDA), smartphone or cell phone) may connect. Such a port 246 may enable the information display device 200 to provide input or output functionality to the mobile device. For example, the information display device 200 may display content from the mobile device 249 on one of its screens, such as the screen 231, and receive input from an input device associated with the information display device 200, such as the keyboard 243. In some implementations, the information display device may connect to a "docking station" base (not shown) that includes an integrated keyboard in place of the keyboard 243. Such a docking station base may also provide power and connectivity for input or output devices either in addition to or in place of parts 240, 246 or 252. Moreover, in some implementations, the docking station may include a wired or wireless network interface that is coupled to the information display device 200 when the information display device 200 is engaged with the docking station.

In some implementations, the information display device 200 may include general computing functionality. For example, the information display device 200 may be operable to run computer programs, including, for example, a commercial operating system and application programs. The information display device 200 may include a storage device 258, such as, for example, a hard disk drive (HDD), an optical storage device, or a flash memory device (e.g., a portable USB storage device) or random-access memory device. The storage device 258 may store information files for display on the screens 231, 232 and 233. These implementations may enable a user to use his or her information display device 200 as a portable personal computer, as well as a multi-screen information display device. As a few non-limiting examples, the information display device 200 may run various programs to provide PDA functionality, calendaring functionality, email support, and personal information management functions.

The information display device 200 may include additional ports or interfaces 252, such as, for example, a Universal Serial Bus (USB) port, power ports, IEEE-1394 ports, Ethernet or Firewire™ interfaces, or other interfaces for sending or receiving power. These interfaces may be wired interfaces, or they may be wireless interfaces. For example, the information display device 200 may include an integrated wireless interface 255, such as, for example, an IEEE 802.11 interface, an IEEE 802.16 interface, a BlueTooth™ interface, a TDMA (time division multiple access) interface, a CDMA (code division multiple access) interface, a GSM (Global System for Mobile Communications) interface, or another wireless interface. With the interface 255, the information display device 200 may obtain networked information files for display in the information display device. The networked information files may be obtained, for example, from the Internet or from private networks. In some implementations, the interface 255 may enable the information display device to provide mobile or wireless services directly, without a connection to another mobile device 249.

FIG. 3A illustrates various angles that may be relevant to controlling content displayed in some implementations, such as, for example, in the information display device 100 that is shown in FIG. 1A. As shown in a configuration 301, the first panel 103 is "open," while the second panel 106 and third panel 109 are "closed." That is, the first panel 103 is shown rotated counterclockwise about an axis corresponding to the hinge 115, such that a user may view display screens disposed on the back side 123B of the first panel 103 and on the front side 126A of the second panel 106.

As shown, an angle 302 is formed by the relative positions of the panels 103 and 106. A sensor (not shown) may sense this angle 302, and a controller (not shown) may control display of content in a first electronic display group of the information display device 100 based on the sensed angle 302. As shown, the first electronic display group may include the first screen 131 and the second screen 132. In some implementations, controller functionality may be provided by a computing device subsystem that includes a processor, memory, a storage device, and an input/output device, such as is described with reference to FIG. 5. Based on the angle 302, the controller may determine when one or more screens in the first electronic display group (e.g., the first screen 131 and the second screen 132) are positioned such that they are likely visible to a user; at such a point, the controller may power on the screen(s) in the first electronic display group. As a more specific example, when the first panel 103 has an angle 302 of approximately 60° relative to the second panel 106, content that is displayed in a screen on the front side 126A of the second panel (e.g., screen 132) may be visible to a user. In some implementations, 60° may serve as a first control angle 313A for the controller. In some implementations another angle or other angles may be used to control the display of content (e.g., 0°, 5°, 90°, etc.).

In some configurations, the controller may cause content to be displayed based on an angle 302 between the first panel 103 and the second panel 106, and in some configurations, the controller may cause content to be displayed based on an angle 304 between the second panel 106 and the third panel 109. For example, the controller may determine whether to display content in a second electronic display group (e.g., an electronic display group comprising the third screen 133 and the fourth screen 134) based on the angle 304. As will be apparent from other figures, a specific control angle may be measured relative to a right horizontal axis (e.g., angle 307A) or relative to a left horizontal axis (e.g., angle 307B).

The controller may use other control angles to control display or processing of content in the information display device. For example, in some implementations, an angle 307A or 307B (e.g., an angle of approximately 30°) may cause the controller to perform another action or content-processing step, such as, for example, prefetching content to display in an electronic display group. The electronic display group for which such content is prefetched may not yet be visible to a user. In some implementations, prefetching content may reduce a content-access latency that may otherwise be present. For example, if content for display is retrieved wirelessly from a networked storage device, some processing time may be required to access and load the content into memory associated with an electronic display group. As another example, graphical content may require rendering prior to being displayed, and this rendering may require some processing time. By prefetching or rendering content before it is actually displayed, apparent access latency may be reduced or hidden from a user. Examples of display and processing of content based on various angles relative to the panels 103, 106 and 109 are now described.

Figure 3B:
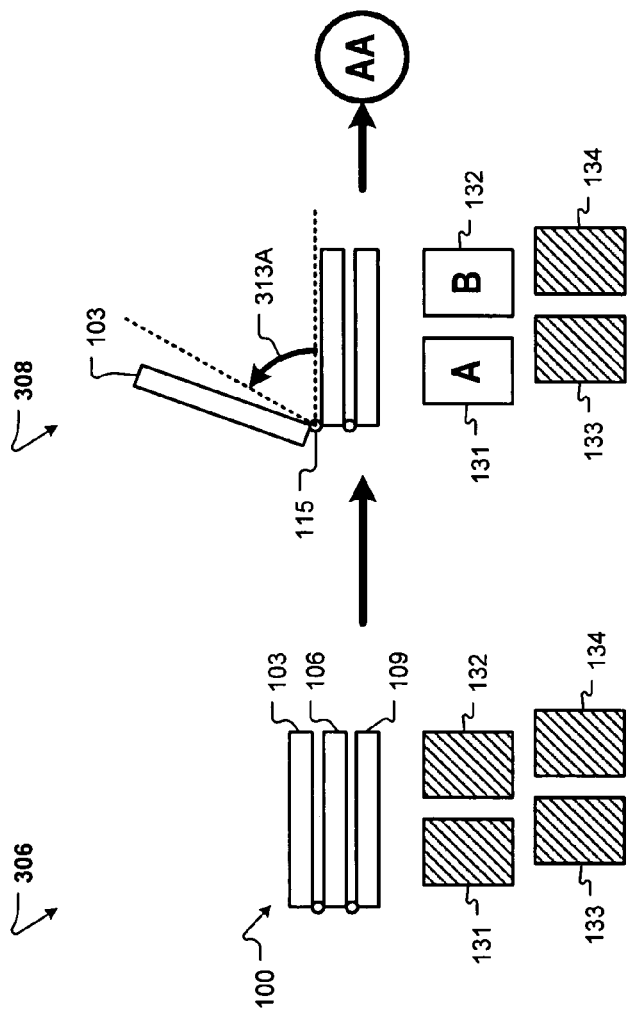
FIGS. 3B, 3C and 3D illustrate examples of configurations for a three-panel information display device.
Figure 3C:
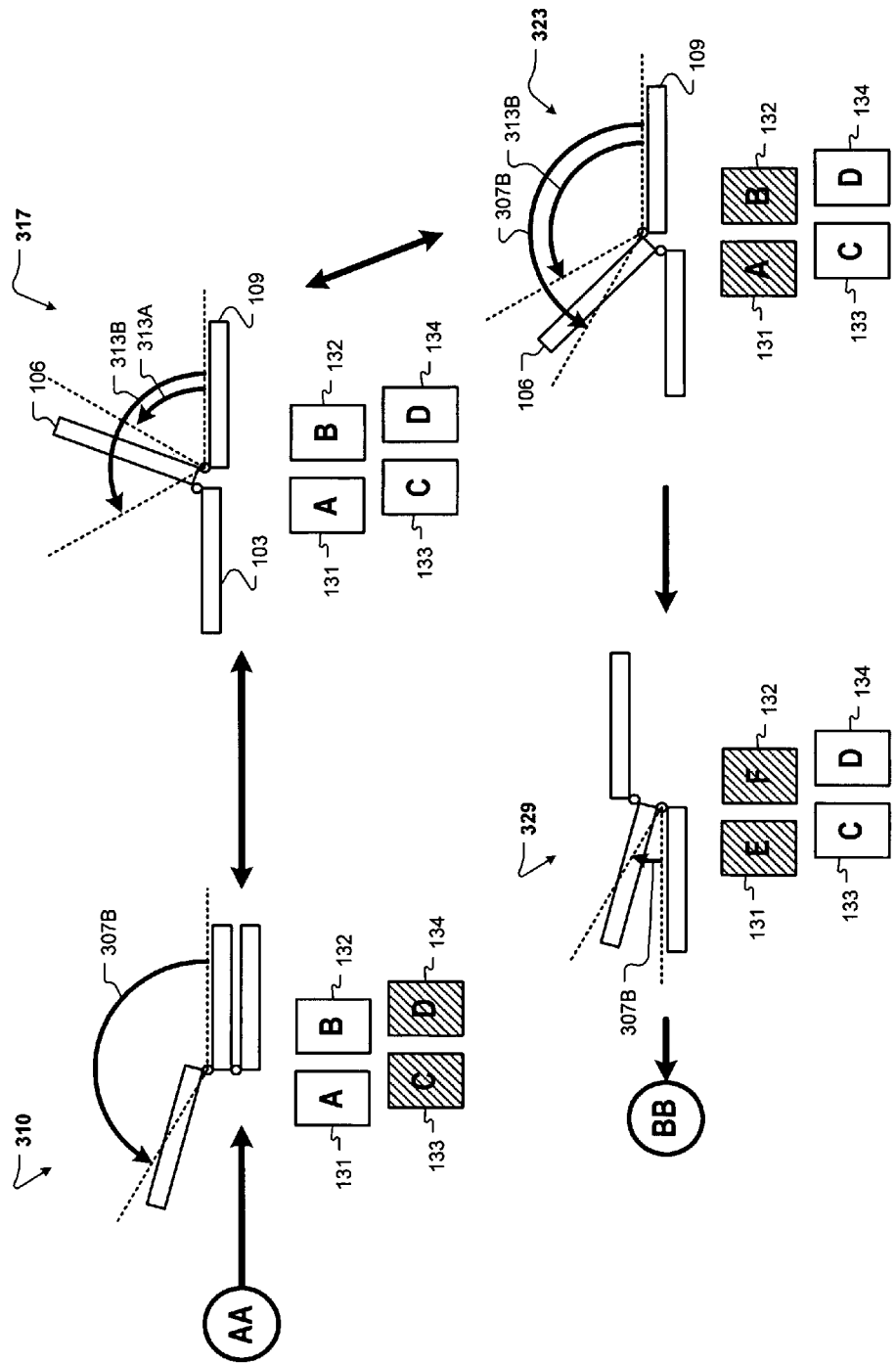
Figure 3D:
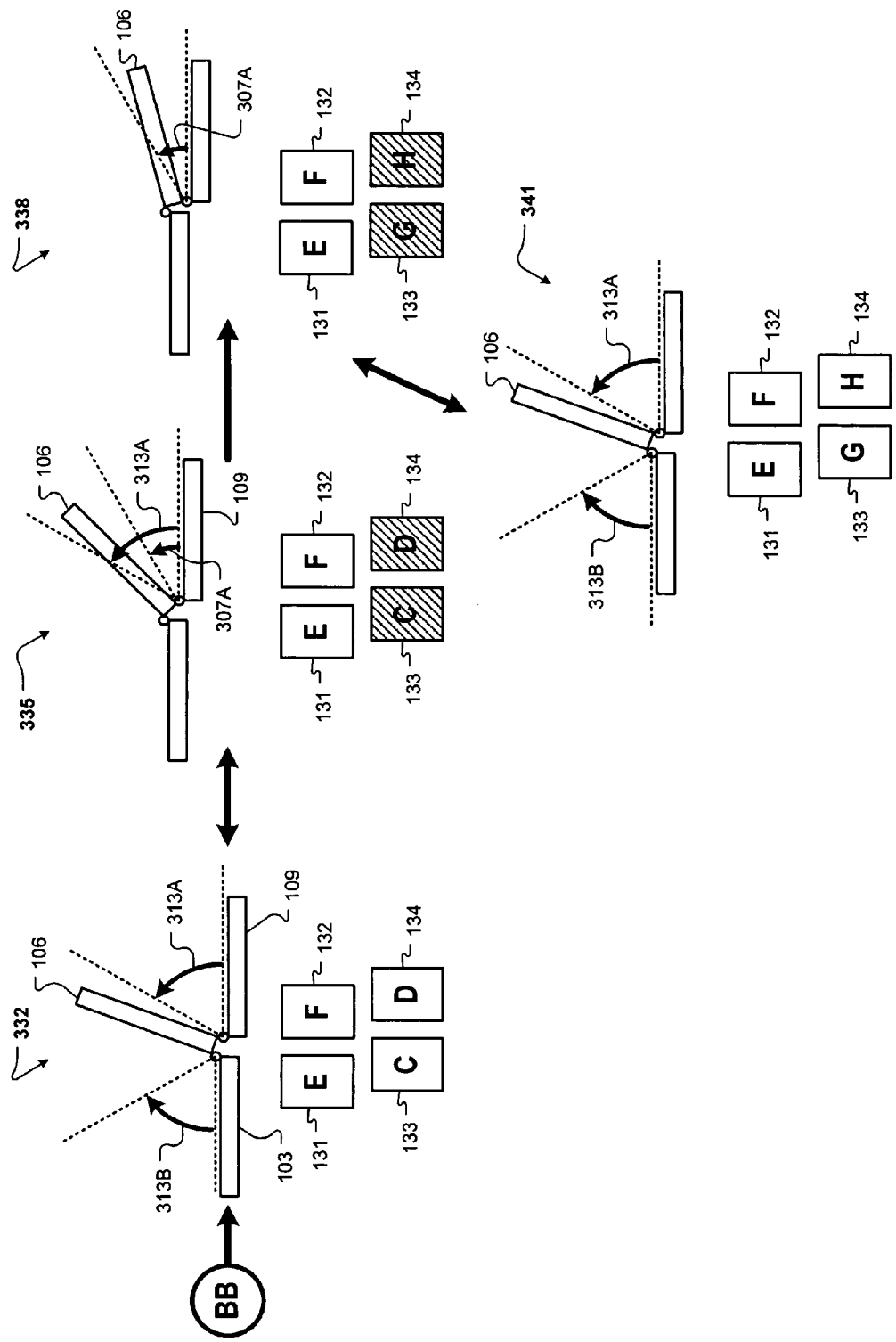

FIGS. 3B, 3C and 3D illustrate examples of configurations for a three-panel information display device, such as the information display device 100. As illustrated, one or more panels of the information display device may be rotated to display content, prefetch (and optionally render) new content, and display the new content. In some implementations, the exemplary configurations may be characterized by positions of the various panels relative to each other. In some configurations, content may be displayed in all four screens at once (e.g., in two electronic display groups); in other configurations, content may only displayed in two of the screens (e.g., in one electronic display group). For example, screens may be powered down to conserve power based on their position relative to a viewing angle a user may have of the various screens. If the user is unlikely to be able to see a screen, it may be powered down; on the other hand, if the user may be able to see a screen with little or no manipulation of a panel, the screen may be powered on. Several panel configurations are illustrated in FIGS. 3B, 3C and 3D. In each configuration, an end view of the information display device 100 is provided, along with a depiction of the electronic display screens 131, 132, 133 and 134.

As shown in configuration 306, the panels 103, 106 and 109 are "closed." That is, the panels are stacked compactly on top of each, such that none of the four display screens is visible. In some implementations, when the information display device 100 is in this configuration 306, all of the screens 131, 132, 133 and 134 may be powered off.

From the configuration 306, a user may "open" the first panel 103, as shown in configuration 308, by rotating the panel 103 counterclockwise about the axis corresponding to the length of the first hinge 115. In some implementations, a user may first release a latching mechanism that secures panels together (e.g., panel 103 and 106) before rotating the panel (e.g., panel 103). As described above, a sensor may detect movement of the first panel relative to the other panels, the sensor may capture the angle between the first panel 103 and the second panel 106, or the sensor may sense the release of a latching mechanism. In some implementations, once the angle between the first panel 103 and the second panel 106 exceeds a first control angle 313A, a controller may cause content to be displayed in one or more the screens. For example, as schematically depicted in FIG. 3B, the controller may power on the screens 131 and 132, and display content 'A' in screen 131 and content 'B' in screen 132. In the configuration 308, screens 133 and 134 may remain off.

From the configuration 308, the user may continue opening the first panel 103 by continuing to rotate the panel counterclockwise about the axis of the first hinge 115, as shown in a configuration 310. In some implementations, once the angle between the first panel 103 and the second panel 106 exceeds a second control angle 307B, the controller may prefetch content and load it into memory associated with the electronic display screens 133 and 134, as is schematically depicted in FIG. 3C. For example, content 'C' may be prefetched and loaded into memory associated with screen 133, and content 'D' may also be prefetched and loaded into memory associated with screen 134. If necessary, the content 'C' and 'D' may be rendered. By prefetching and loading content associated with one or more display screens (and rendering the content if necessary), the information display device 100 may reduce or eliminate apparent access latency once the one or more screens are powered on.

From the configuration 310, the user may open the second panel by rotating it counterclockwise about an axis corresponding one of its hinges, as shown in a configuration 317. In some implementations, the controller may cause information to be displayed in all of the screens 131, 132, 133 and 134 when the second panel 106 has an angle relative to one of the other panels (e.g., the third panel 109) between the control angle 313A and the control angle 313B. In the configuration 317, a user of the exemplary information display device may rotate the panel 106 back and forth to see information on any one of the four screens. In this configuration 317, a user may assimilate a large amount of material at once. As a specific example, the information display device 100 may be used to display mathematic material from a textbook, and content 'D' on screen 133 may reference an equation that was previously displayed in content 'A' on screen 131. In the configuration 317, a user may be able to readily view the equation by rotating the panel 106 clockwise to bring the panel 103 and its content 'A' into view. After viewing the equation on screen 131, the user may again rotate the panel 106 to reveal panel 109 and the content 'D' displayed on the screen 134 on panel 109. In this manner, a user may have access to a large amount of information, with very little manipulation of the information display device. Moreover, the user may access this information in a manner similar to accessing information in a printed book.

From the configuration 317, the user may continue rotating the second panel 106 counterclockwise, past the control angle 313B, as shown in configuration 323. In some implementations, the controller may cause the screens 131 and 132 to be powered down when the second panel 106 has an angle relative to the third panel 109 that is between the control angle 307B and the control angle 313B. In this configuration 323, content that was previously displayed in the screens 131 and 132 may be retained in memory associated with those screens, such that it is "cached" and available for immediate display if the screens 131 and 132 are powered back on. For example, in some implementations, the user may be able to rotate the panel 106 back and forth between configuration 323 and configuration 317 to alternately display information in all four screens at once, and display information in only two screens while retaining cached content for the other two screens.

From the configuration 323, the user may continue rotating the second panel 106 counterclockwise past the control angle 307B (shown relative to a left horizontal axis), as shown in configuration 329. In the configuration 329, the information display device 100 may prefetch new content for the screens 131 and 132. That is, content 'A' and 'B' may be flushed from memory associated with the screens 131 and 132, and new content 'E' and 'F' may be prefetched and loaded in the memory associated with screens 131 and 132.

From the configuration 329, the user may rotate the second panel 106 clockwise, as shown in a configuration 332. In the configuration 332, when the second panel 106 has an angle relative to the first panel 103 that is greater than a control angle 313B, or an angle relative to the third panel 109 that is greater than a control angle 313A, all four display screens 131, 132, 133 and 134 may be powered on and may display content-similar to the configuration 317, but with updated content for the screens 131 and 132.

From the configuration 332, the user may continue to rotate the second panel 106 clockwise, as shown in a configuration 335. In the configuration 335, when the second panel 106 has an angle relative to the third panel 109 of between the control angle 313A and the control angle 307A, the controller may cause the screens 133 and 134 to be powered down. Content that was previously displayed in the screens 133 and 134 may be cached in memory associated with the screens 133 and 134, as it was in the exemplary configuration 323. The user may be able to rotate the panel 106 back and forth between configuration 335 and configuration 332 to alternately display information in all four screens at once, and display information in only two screens while retaining cached content for the other two screens.

From the configuration 335, the user may continue to rotate the second panel 106 clockwise, as shown in a configuration 338. In the configuration 338, the information display device 100 may prefetch new content for the screens 133 and 134. That is, content 'C' and 'D' may be flushed from memory associated with the screens 133 and 134, and new content 'G' and 'H' may be prefetched and loaded in the memory associated with screens 133 and 134.

From the configuration 338, the user may again rotate the second panel 106 counterclockwise, as shown in a configuration 341. In some implementations, when the second panel 106 has an angle relative to the first panel that is greater than the control angle 313B, or an angle relative to the third panel 109 that is greater than the control angle 313A, all four display screens 131, 132, 133 and 134 may be powered on and displaying content—similar to the configurations 317 and 332, but with updated content for the screens.

The foregoing process of rotating panels to update content displayed on screens on the panels may be continued as described. Thus, in some implementations, a user may rotate a panel 106 back and forth to progressively display portions of an information file. As described with reference to FIGS. 3B, 3C, and 3D, a user may rotate the panel 106 back and forth to progressively display exemplary content 'A' and 'B,' 'C' and 'D,' 'E' and 'F,' and 'G' and 'H.' In some implementations, a user may enter input while he or she is rotating a panel to alter the order in which content is displayed in the exemplary information display device 100. For example, from the configuration 338 in which new content 'G' and 'H' have been prefetched for display in screens, the user may rotate the panel 106 counterclockwise while simultaneously entering user input, such as, for example input via a pushbutton switch. The user input may cause the information display device 100 to reload previously displayed content 'C' and 'D' and display that content, as in configuration 332, rather than displaying content 'G' and 'H.' In this manner, a user may optionally traverse content in reverse order, as if paging through a book backwards.

In some implementations, a user may select content from a content menu on a screen in one electronic display group, and the selected content may be subsequently displayed on a screen in another electronic display group. For example, referring to the information display device 200 that is shown in FIGS. 2A and 2B, a menu may be available from the screen 231. When a user opens the panel 203 by rotating it counterclockwise about an axis 216, the screen 231 may be powered down, and selected content may be displayed on the screens 232 and 233. The user may traverse additional content by providing additional user input, such as, for example, by actuating pushbutton switches (not shown) that may be disposed on the information display device 200 (e.g., on the back side 223B of the panel 203 and on the front side 226A of the panel 206). In some implementations, when the user rotates the panel 203 clockwise past a specific control angle (not shown), the information display device 200 may power down the screens 232 and 233, power on the screen 231, and display a menu of available content, from which the user may select new content to display.

In some implementations, such as implementations in which a sensor senses whether a latching mechanism securing two panels together is engaged or released, rather than sensing an angle of one panel relative to another panel, display of content may be controlled in other ways. For example, referring to configuration 306 in FIG. 3B, a user may release a latching mechanism (not shown) in order to rotate panel 103 counterclockwise. Releasing the latching mechanism may cause content 'A' and 'B;' to be displayed in screens 131 and 132, as shown in configuration 308. To rotate the second panel 106 counterclockwise, the user may have to release a second latching mechanism (not shown). Release of the second latching mechanism may cause the screens 131 and 132 to be turned off, and content to be loaded and displayed in the screens 133 and 143 (e.g., content 'C' and 'D' as shown in configuration 323). New content (e.g., content 'E' and 'F') may be prefetched when the user latches the first panel 103 and the second panel 106 together (e.g., when the panels 103 and 106 are roughly opposite panel 109, similar to how the panels are shown in configuration 329). Releasing the first latching mechanism to rotate the panel 106 clockwise may cause the screens 133 and 134 to be powered down and the screens 131 and 132 to display content (e.g., content 'E' and 'F' as shown in the configuration 335). Display of content on multiple screens in the information display device may be controlled in other ways based on manipulation of panels of the information display device.

Figure 4:
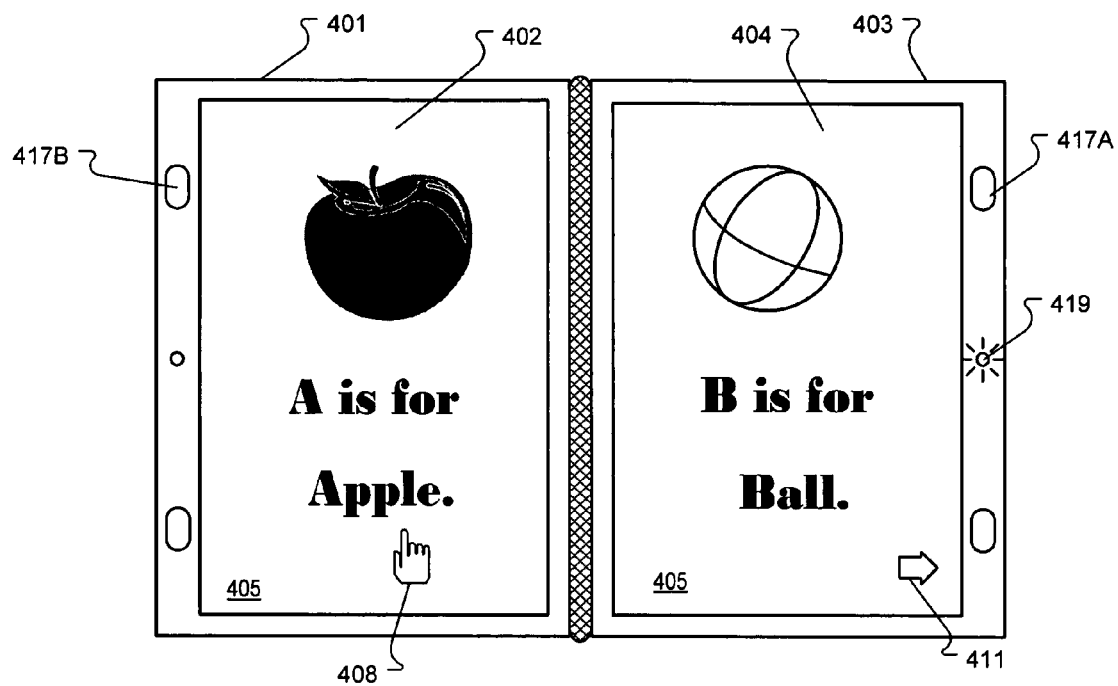
FIG. 4 illustrates a configuration in which an information display device may be used for instructional purposes.

FIG. 4 is a diagram illustrating a configuration in which an information display device 400 may be used for instructional purposes. As shown, the configuration includes two panels 401 and 403 and two electronic display screens 402 and 404 disposed on the panels 401 and 403. As shown, each screen 402 and 404 displays sample instructional material 405, such as material to teach someone to read.

Instruction material may include graphical content, such as text, pictures, or video, and the information display device may provide various secondary output to enhance the effectiveness of the instructional material. For example, the information display device 400 may display a moving graphical element, such as a pointer 408 to guide a reader from syllable to syllable or from word to word. The information display device 400 may provide audio content via a speaker (not shown). For example, audio content corresponding to text in the instructional material may be played while the pointer 408 moves under the text to teach word recognition to a beginning reader. For advanced readers, the pointer 408 may traverse more challenging text (not shown) in order to help the reader to increase his or her reading speed. In some implementations, the pointer 408 may be configured to move under corresponding text at a predetermined rate of speed.

In some implementations, such as those with three panels, the information display device may be further configured to teach a beginning reader concepts of print, such as when to turn pages. The instructional material may simulate contents of a book, and the information display device may signal the reader to turn a "page" (rotate a panel) at appropriate times. For example, the information display device may display a graphical element, such as an arrow 411 to signal a reader to rotate the panel 403 to display new content on different display screens (not shown in FIG. 4, but see FIG. 1C for reference). In some implementations, the information display device may indicate that a panel should be rotated by flashing a light-producing device, such as a light emitting diode (LED) 419. In some implementations, the information display device may include tactile output devices, such as pads 417A and 417B. The pads 417A and 417B may be positioned where a reader would naturally grip the panels of the information display device. When a panel is to be rotated, the pads may vibrate. For example, if the panel 403 is to be rotated toward panel 401 to display information behind panel 403, the pad 417A may vibrate; similarly, if the panel 401 is to be rotated toward panel 403 to display information behind panel 401, the pad 417B may vibrate.

Figure 5:
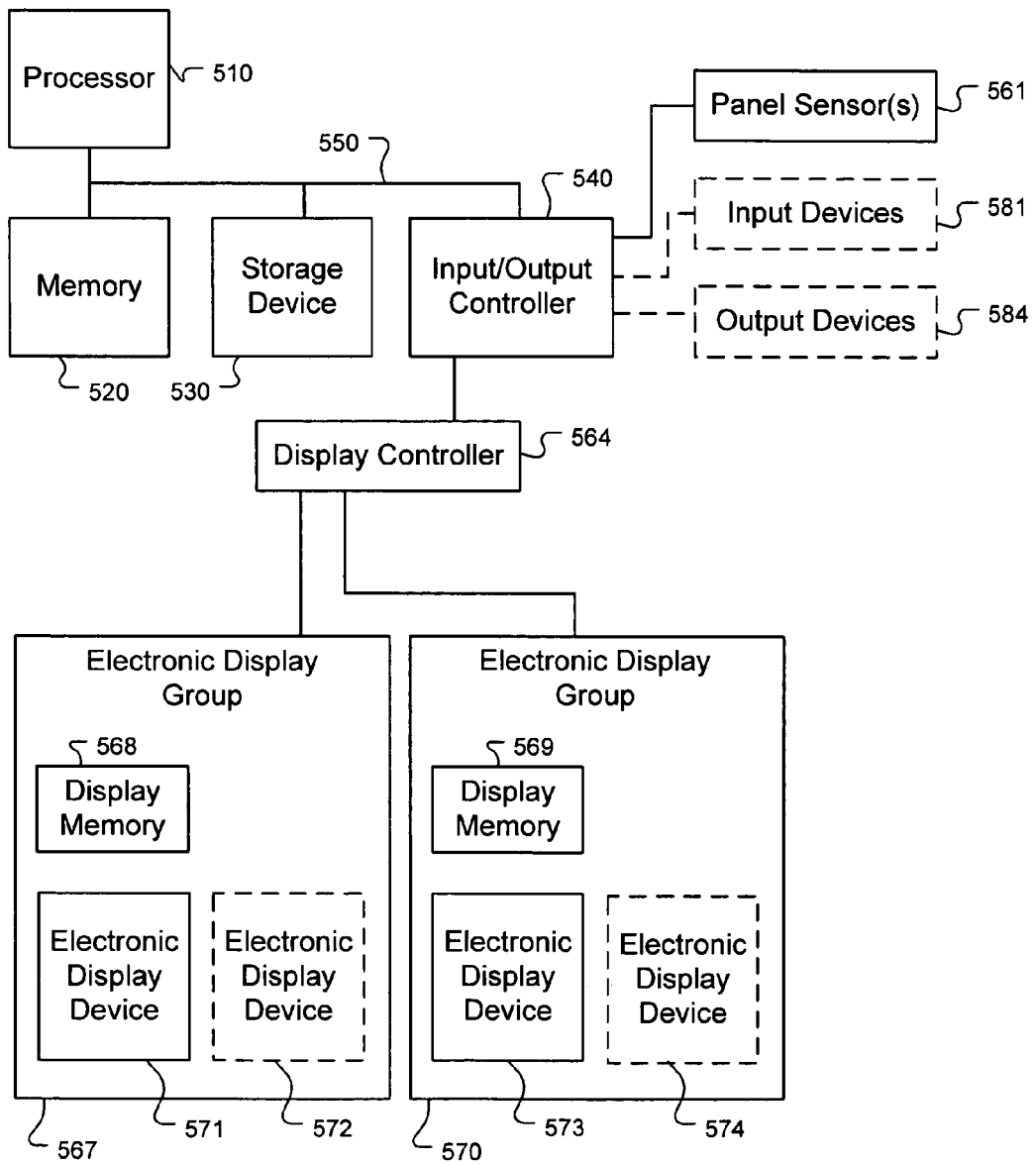
FIG. 5 is a schematic diagram of components that may be included within an information display device.

FIG. 5 is a schematic diagram of components that may be included in an exemplary information display device 500. At its core, the information display device 500 may include a computing device, comprising a processor 510, memory 520, a storage device 530, and an input/output controller 540. Each of the components 510, 520, 530 and 540 may be interconnected by a system bus 550. A display controller 564 may be coupled to the input/output controller 540. In addition, one or more panel sensors 561 and additional input devices 581 and output devices 584 may be coupled to the input/output controller 540.

The processor 510 may be capable of processing instructions for execution within the system 500. In some implementations, the processor 510 may be a single-threaded processor. In some implementations, the processor 510 may be a multi-threaded processor. The processor 510 may be capable of processing instructions stored in the memory 520 or in the storage device 530, or in both. Suitable processors for the execution of a program of instructions may include, by way of example, both general and special purpose microprocessors, and the sole processor or one of multiple processors of any kind of computer. Generally, a processor will receive instructions and data from a read-only memory or a random access memory or both. Generally, a computing device will also include, or be operatively coupled to communicate with, one or more mass storage devices for storing data files.

The memory 520 may store information within the system 500. In some implementations, the memory 520 may be a computer-readable medium. In some implementations, the memory 520 may be a volatile memory unit. In some implementations, the memory 520 may be a non-volatile memory unit. The storage device 530 may provide mass storage for the system 500. In some implementations, the storage device 530 may be a computer-readable medium. In some implementations, the storage device 530 may be a floppy disk device, a hard disk device, an optical disk device, or a tape device. The storage device may provide an interface for removable storage media, such as an optical disk. In some implementations, the storage device 530 may locally store information files for display in the information display device 500.

Exemplary storage devices may include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

The input/output device 540 may provide input/output operations for the system 500. In some implementations, input devices 581 may include a keyboard, a pointing device, a stylus, or pushbutton switches. The input devices 581 and the output devices 584 may include a wired or wireless network interface for transferring information from a networked storage device to the memory 520 or the storage device 530. The information display device 500 may retrieve, via the network interface, various information files from the networked storage device for display.

One or more panel sensors 561 may sense relative position of the panels or relative movement of panels in the exemplary information display device 500. For example, each hinge that connects two panels may have a corresponding sensor that senses an angle of the two panels relative to each other.

In conjunction with the input/output controller 540, a display controller 564 may control display of information in various electronic display groups. For example, as shown, the information display device may include two electronic display groups 567 and 570. In some implementations, the information display device 500 may include one or more additional electronic display groups (not shown). Each electronic display group includes one or more electronic display devices and may further include dedicated memory. For example, as shown, the electronic display group 567 includes display memory 568, an electronic display device 571 and an optional electronic display device 572. Further, the electronic display group 570 includes display memory 569, an electronic display device 573 and an optional electronic display device 574. In some implementations, additional electronic display devices may be included in an electronic display group. In some implementations, each electronic display device may have its own display memory. Referring to FIGS. 1A, 1B and 1C for one example, the screens 131 and 132 may correspond to the electronic display devices 571 and 572, and the screens 133 and 134 may correspond to electronic display devices 573 and 574. Further, the screens 131 and 132 may be included in the electronic display group 567, and the screens 133 and 134 may be included in the electronic display group 570. Referring to FIGS. 2A and 2B for another example, the screen 231 may correspond to the electronic display device 571 and may comprise the electronic display group 567; the screens 232 and 233 may correspond to the electronic display devices 573 and 574 and may comprise the electronic display group 570.

Figure 6:
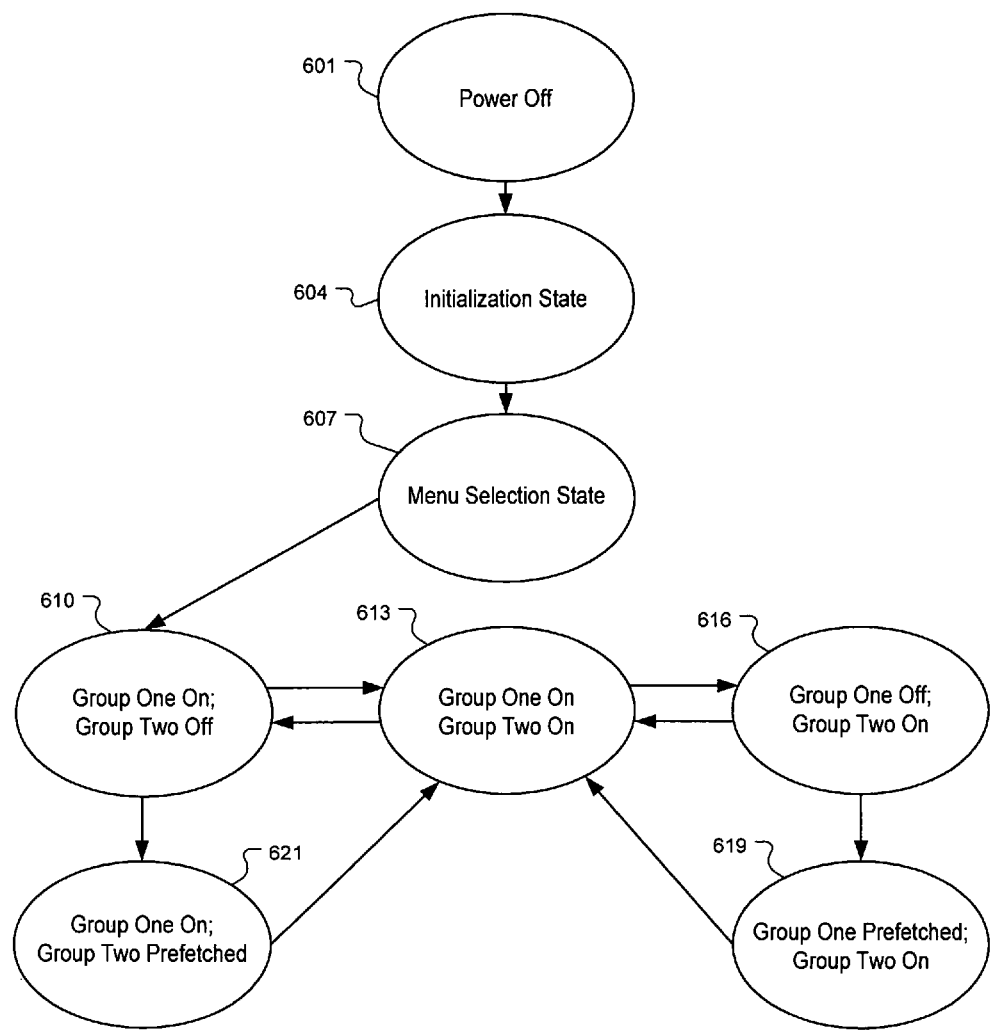
FIG. 6 is a state diagram illustrating states an information display device may occupy.

FIG. 6 is a state diagram illustrating examples of possible states an information display device may occupy. The information display device may occupy a single state at one time but may transition from one state to another based on, for example, user input or sensor input.

In a powered-down state 601, the information display device may be in a low power mode (e.g., off). In some implementations, no user interface may be functional in the state 601, but some memory functionality may be retained. In response to input from a user, or in response to internal timer input (e.g., a scheduled wake-up function), the information display device may transition to an initialization state 604.

In the initialization state 604, the information display device may perform various initialization functions in preparation for displaying information or providing user functionality. For example, in the state 604, the information display device may load an operating system and/or application programs. Further, the information display device may retrieve available information files for display in the information display device. In some implementations, an information file may be retrieved from a storage device integrated in the information display device; in some implementations, an information file may be retrieved from a networked storage device (e.g., via a wireless network interface). In some implementations, that information display device may transition to a menu selection state 607 after necessary initialization functions have been performed.

In a menu selection state 607, the information display device may display to a user a list of various information files that are available for display. The list may include files that are stored locally on the information display device; the list may include files that are accessible via a wired or wireless network interface. The information display device may solicit input from a user to select a file for display.

In response to user input selecting a file for display, the information display device may transition to a display state 610 in which a first electronic display group is powered on and a second electronic display group is powered off. Referring to the configuration 308 in FIG. 3B, a first portion of a selected information file (e.g., content 'A' and 'B') may be displayed in a first electronic display group (e.g., screens 131 and 132), while a second electronic display group (e.g., 133 and 134) remains powered down.

In some implementations, additional input may be required before the information display device transitions to the state 610. For example, input from a panel sensor may also be required. Referring to FIG. 2A, a menu may be displayed on screen 231 in state 607. In response to user input selecting an information file from the menu, and further in response to input from a sensor indicating that the panel 203 has been rotated counterclockwise relative to the panel 206, a first portion of the selected information file may be displayed in screens 232 and 233, while screen 231 may be powered off. In some implementations, the information display device may transition to a state 621 or to a state 613 from the state 610.

In the state 621, the information display device may display a first portion of an information file in a first electronic display group and prefetch a second portion of the information file for subsequent display in a second electronic display group. In some implementations, the information display device may transition to the state 621 based on sensor input that indicates that panels have been moved relative to each other, or that two panels have a specific angle relative to each other. For example, referring to the configuration 310 in FIG. 3C, the information display device 100 may display a first portion of an information file (e.g., content 'A' and 'B') in a first electronic display group (e.g., screens 131 and 132), while prefetching a second portion of the information file (e.g., content 'C' and 'D') for display in a second electronic display group (e.g., screens 133 and 134). Based on additional sensor input, the information display device may transition to the state 613.

In the state 613, content may be simultaneously displayed in two electronic display groups. For example, referring again to FIG. 3C, rotation of the panel 106 in configuration 317 may cause content 'A' and 'B' and content 'C' and 'D' to be respectively displayed in screens 131 and 132 and in screens 133 and 134.

In some implementations, the information display device may transition from the state 613 to either the state 610 or a state 616. Either transition may be in response to additional sensor input or in response to user input. For example, referring to FIG. 3C and the corresponding description above, the information display device 100 may transition from the configuration 317 (state 613) to the configuration 310 (state 610), or from the configuration 317 (state 613) to the configuration 323 (state 616).

In the state 616, the electronic display group that was powered down in state 610 and for which content may have been prefetched (e.g., screens 133 and 134), may be powered on, and the electronic display group that was previously powered on (e.g., screens 131 and 132) may be powered off. From the state 616, the information display device may transition to either the state 613 or a state 619.

In the state 619, the information display device may prefetch content for display in the first display group. For example, referring to FIG. 3C, the information display device 100 may prefetch content for the screens 131 and 132 (e.g., the first electronic display group) in the configuration 329.

The information display device may transition from one state to another as illustrated in the state diagram 600 and as described with reference to FIGS. 3B, 3C and 3D. As described above, state transitions may result from user input, or from sensor input, or from both. In some implementations, the information display device may be transitioned to the powered-down state 601 from any other state (transitions not shown), and in some implementations, the information display device may also be transitioned to the menu selection state 607 from any state other than the powered-down state 601 (transitions not shown).

The features described herein may be implemented in digital electronic circuitry, or in computer hardware, firmware, software, or in combinations of them. The apparatus may be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language, including compiled or interpreted languages, and it can be deployed in any form, including as a stand-alone program or as a module, component, subroutine, or other unit suitable for use in a computing environment.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a wired or wireless network interface. The relationship of client and server may arise by virtue of computer programs running on the respective computers and having a client-server relationship to each other.

Implementations may be implemented, at least in part, in hardware or software or in any combination thereof. Hardware may include, for example, analog, digital or mixed-signal circuitry, including discrete components, integrated circuits (ICs), or application-specific ICs (ASICs). Implementations may also be implemented, in whole or in part, in software or firmware, which may cooperate with hardware. Processors for executing instructions may retrieve instructions from a data storage medium, such as EPROM, EEPROM, NVRAM, ROM, RAM, a CD-ROM, a HDD, and the like. Computer program products may include storage media that contain program instructions for implementing implementations described herein.

A number of implementations have been described. Nevertheless, it will be understood that various modifications may be made without departing from the spirit and scope of this document. Accordingly, other implementations are within the scope of the following claims:

What is claimed is:

1. An information display device comprising:
    a plurality of panels comprising at least a first panel and a second panel, each of the panels having a front side and back side and being hingedly connected to the other panels;
    a plurality of electronic display screens disposed on the plurality of panels, comprising at least a first screen, a second screen and a third screen;
    an information storage device;
    a sensor operable to detect an angle between the panels relative to each other; and
    a controller operable to display in one or more of the electronic display screens information that is stored in the information storage device in response to the sensor detecting an angle between the panels relative to each other.

2. The information display device of claim 1, wherein the first screen is disposed on the front side of the first panel, the second screen is disposed on the back side of the first panel, and the third screen disposed on the front side of the second panel.

3. The information display device of claim 1, further comprising a third panel and a fourth screen, wherein the first screen is disposed on the back side of the first panel, the second screen is disposed on the front side of the second panel, the third screen is disposed on the back of the second panel, and the fourth screen is disposed on the front of the third panel.

4. The information display device of claim 1, wherein the first panel rotates about an axis that is parallel to the length of the hinged connection between the first panel and the second panel.

5. A computer program product tangibly embodied in a computer-readable medium, the computer program product comprising instructions that, when executed, cause a data processing apparatus to perform operations comprising:
    obtaining an information file to display in an information display device, the information display device comprising two or more panels and two or more electronic display groups, each electronic display group comprising one or more electronic display screens that display information and that are disposed on the two or more panels, the information display device further comprising one or more sensors that generate signals indicating at least one of an angle between two of the two or more panels or movement of one of the two or more panels relative to another of the two or more panels;
    receiving a first signal from the one or more sensors;
    displaying a first portion of the obtained information file in a first electronic display group in response to the received first signal; receiving a second signal from the one or more sensors; and in response to the second signal, prefetching a second portion of the obtained information file for display in a second electronic display group.

6. The computer program product of claim 5, wherein the operations further comprise:
  receiving a third signal from the one or more sensors; and
  in response to the third signal, displaying the second portion of the obtained information file in the second electronic display group.

7. The computer program product of claim 6, wherein the first portion and the second portion are displayed simultaneously.

8. The computer program product of claim 6, wherein the operations further comprise:
  receiving a fourth signal from the one or more sensors; and
  in response to the fourth signal, powering down the first electronic display group.

9. The computer program product of claim 8, wherein the operations further comprise:
  receiving a fifth signal from the one or more sensors; and
  in response to the fifth signal, displaying the first portion in the first electronic display group and simultaneously displaying the second portion in the second electronic display group.

10. The computer program product of claim 8, wherein the operations further comprise:
  receiving a fifth signal from the one or more sensors; and
  in response to the fifth signal, prefetching a third portion of the obtained information file for display in the first electronic display group.

11. The computer program product of claim 10, wherein the operations further comprise:
  receiving a sixth signal from the one or more sensors; and
  in response to the sixth signal, displaying the third portion of the obtained information file in the first electronic display group.

12. The computer program product of claim 10, wherein the operations further comprise:
  receiving a control signal and a sixth signal from the one or more sensors; and
  in response to the control signal and the sixth signal, displaying the first portion of the obtained information file in the first electronic display group.

13. The computer program product of claim 5, wherein the operations further comprise:
  displaying a menu of information files; and
  receiving user input in response to the menu,
  wherein the information file is obtained in response to the user input.

14. The computer program product of claim 5, wherein at least one of the two or more electronic display groups comprises a touch-sensitive screen operable to receive touch-screen input.

15. The computer program product of claim 14, wherein the operations further comprise:
  receiving touch-screen input associated with the first portion;
  storing customization data associated with the first portion in response to the touch-screen input; and
  displaying customized information with the first portion that corresponds to the stored customization data, wherein the customized information is selected from the group consisting of highlighting, a bookmark, or an annotation.

16. The computer program product of claim 5, wherein the information file is obtained from at least one of storage media in the information display device, a storage medium coupled to a storage media reader in the information display device, and networked storage media accessible to the information display device by a direct network connection or by a wireless network connection.

17. The computer program product of claim 5, wherein the operations further comprise providing sensory output corresponding to the first portion, the sensory output selected from the group consisting of image output, auditory output, light output and tactile output.

18. The computer program product of claim 5, wherein the information file comprises words, and the operations further comprise successively highlighting one or more words at a time, at a specific words-per-minute rate.

19. A method of displaying information in an information display device, the method comprising:
  retrieving an information file from storage media accessible from an information display device, the information display device comprising a first panel and a second panel hingedly connected to the first panel, two or more electronic display screens disposed on the first panel and the second panel, and a sensor that provides a value representative of an angle of the first panel relative to the second panel;
  displaying a first portion of the retrieved information file in a first electronic display screen based on a first value from the sensor;
  displaying a second portion of the retrieved information file in a second electronic display screen based on a second value from the sensor; and
  subsequently displaying either the first portion or a third portion of the retrieved information file in the first electronic display screen based on a third value from the sensor.

* * * * *

UNITED STATES PATENT AND TRADEMARK OFFICE
CERTIFICATE OF CORRECTION

PATENT NO. : 7,636,071 B2  Page 1 of 1
APPLICATION NO. : 11/290612
DATED : December 22, 2009
INVENTOR(S) : Robert W. O'Gorman It is certified that error appears in the above-identified patent and that said Letters Patent is hereby corrected as shown below:

On Drawing Sheet 1 of 9, in Figure 1A, add " _100_ ", in upright corner above Figure.

On Drawing Sheet 1 of 9, in Figure 1B, add " _100_ ", in upright corner above Figure.

On Drawing Sheet 1 of 9, in Figure 1C, add " _100_ ", in upright corner above Figure.

On Drawing Sheet 2 of 9, in Figure 2A, add " _200_ ", in upright corner above Figure.

On Drawing Sheet 2 of 9, in Figure 2B, add " _200_ ", in upright corner above Figure.

On Drawing Sheet 7 of 9, in Figure 4, add " _400_ ", in upright corner above Figure.

On Drawing Sheet 8 of 9, in Figure 5, add " _500_ ", in upright corner above Figure.

On Drawing Sheet 9 of 9, in Figure 6, add " _600_ ", in upright corner above Figure.

In column 8, line 35, delete "pariels" and insert -- panels --, therefor.

Signed and Sealed this

Thirteenth Day of July, 2010

David J. Kappos
*Director of the United States Patent and Trademark Office*